United States Patent
Christandl et al.

(10) Patent No.: US 8,997,415 B2
(45) Date of Patent: Apr. 7, 2015

(54) LIGHT-CONDUCTING COMPONENT FOR CONSTRUCTIONS AND BUILDINGS AND ALSO PRODUCTION PROCESS THEREFOR

(75) Inventors: Dieter Christandl, Weiz (AT); Josef Christandl, St. Ruprecht/Raab (AT); Robert Hofer, St. Ruprecht/Raab (AT); Oliver Fischer, Dombiru (AT)

(73) Assignees: Dieter Christandl (AT); Josef Christandl (AT); Robert Hofer (AT)

( * ) Notice: Subject to any disclaimer, the term of this patent is extended or adjusted under 35 U.S.C. 154(b) by 0 days.

(21) Appl. No.: 13/980,314

(22) PCT Filed: Jan. 17, 2012

(86) PCT No.: PCT/EP2012/000171
§ 371 (c)(1),
(2), (4) Date: Nov. 20, 2013

(87) PCT Pub. No.: WO2012/097975
PCT Pub. Date: Jul. 26, 2012

(65) Prior Publication Data
US 2014/0059952 A1 Mar. 6, 2014

(30) Foreign Application Priority Data
Jan. 18, 2011 (DE) .......................... 10 2011 008 853

(51) Int. Cl.
*E04B 5/46* (2006.01)
*F21V 8/00* (2006.01)
(Continued)

(52) U.S. Cl.
CPC .......... *G02B 6/0001* (2013.01); *B28B 23/0037* (2013.01); *E04C 1/42* (2013.01); *E04C 2/54* (2013.01)

(58) Field of Classification Search
USPC ............ 52/306, 307, 308, 309.1, 426, 649.8, 52/699; D25/103; 264/261; 359/592; 428/119, 120; 362/582, 153, 153.1, 362/249.15, 253
See application file for complete search history.

(56) References Cited

U.S. PATENT DOCUMENTS 3,091,899 A * 6/1963 Hans Bordlein ................ 52/306
3,904,866 A * 9/1975 Hayes .......................... 362/615
(Continued)

FOREIGN PATENT DOCUMENTS

DE         9310500 U1     4/1994
DE    102007013199 A1    11/2008
(Continued)

OTHER PUBLICATIONS

International Search Report (PCT/EP2012/000171, dated Mar. 20, 2012) (in English) (3 pages).

*Primary Examiner* — Robert Canfield
*Assistant Examiner* — Matthew Gitlin
(74) *Attorney, Agent, or Firm* — The Maxham Firm (57) ABSTRACT

A light-conducting component, in particular finished concrete part in the form of a masonry brick, for constructions and buildings. The component is produced in a casting mold by casting into at least one casting building material and the optical waveguide is made of a light-conducting building material, e.g. PMMA polymer or glass, which is accessible at at least two positions on the outer surface of the light-conducting component for the input of light and output of light. The optical waveguide is configured as a self-supporting 2D or 3D lattice body composed of rods having a thickness/diameter of greater than 1 mm. The self-supporting 2D or 3D lattice body has approximately the same or an only slightly smaller width (W), or length (L), or base dimensions (W, L), or total external dimensions (W, L, H) than the casting mold itself.

21 Claims, 8 Drawing Sheets

(51) Int. Cl.
 *B28B 23/00* (2006.01)
 *E04C 1/42* (2006.01)
 *E04C 2/54* (2006.01)

(56) References Cited

U.S. PATENT DOCUMENTS

| | | | | |
|---|---|---|---|---|
| 4,173,969 | A | * | 11/1979 | Scholl .......................... 126/706 |
| 4,195,907 | A | * | 4/1980 | Zamja et al. ................... 385/125 |
| 4,397,128 | A | * | 8/1983 | Wolde-Tinsae .............. 52/293.2 |
| 4,570,207 | A | * | 2/1986 | Takahashi et al. ......... 362/153.1 |
| 4,752,114 | A | * | 6/1988 | French .......................... 385/115 |
| 4,830,899 | A | * | 5/1989 | Nakahashi et al. ........... 428/137 |
| 4,864,792 | A | * | 9/1989 | Andre et al. ..................... 52/426 |
| 4,999,965 | A | * | 3/1991 | Schmidgall et al. ............ 52/684 |
| 5,809,725 | A | * | 9/1998 | Cretti ............................... 52/426 |
| 6,234,657 | B1 | * | 5/2001 | Shih ............................... 362/559 |
| 6,422,715 | B2 | * | 7/2002 | Naghi et al. ..................... 362/85 |
| 6,832,456 | B1 | * | 12/2004 | Bilowol .......................... 52/426 |
| 7,143,563 | B1 | * | 12/2006 | Palmer ............................ 52/677 |
| 8,091,303 | B2 | * | 1/2012 | Losonczi ......................... 52/307 |
| 8,091,315 | B2 | * | 1/2012 | Losonczi ......................... 52/596 |
| 2005/0183372 | A1 | * | 8/2005 | Losonczi ......................... 52/596 |
| 2007/0074484 | A1 | * | 4/2007 | Yin .................................. 52/750 |
| 2007/0240378 | A2 | * | 10/2007 | Crowell ........................... 52/677 |
| 2007/0251184 | A1 | * | 11/2007 | Schumann ....................... 52/596 |
| 2010/0130081 | A1 | * | 5/2010 | Fischer .......................... 442/181 |
| 2010/0281802 | A1 | * | 11/2010 | Losonczi ......................... 52/307 |
| 2011/0185660 | A1 | * | 8/2011 | Roye ............................... 52/307 |
| 2013/0148357 | A1 | * | 6/2013 | Johnston et al. .............. 362/253 |
| 2014/0059952 | A1 | * | 3/2014 | Christandl et al. ........... 52/173.1 |
| 2014/0328052 | A1 | * | 11/2014 | Hochman et al. ............. 362/147 |

FOREIGN PATENT DOCUMENTS

| | | |
|---|---|---|
| WO | 0230662 A2 | 4/2002 |
| WO | 03097954 A1 | 11/2003 |
| WO | 2009003941 A1 | 1/2009 |
| WO | 2009016151 A1 | 2/2009 |
| WO | 2010028841 A1 | 3/2010 |

* cited by examiner

LIGHT-CONDUCTING COMPONENT FOR CONSTRUCTIONS AND BUILDINGS AND ALSO PRODUCTION PROCESS THEREFOR

FIELD OF INVENTION

The described embodiments of the present invention pertain to a light-conducting component, especially a finished concrete part in the form of a masonry brick, for structures and buildings, as well as its production method.

BACKGROUND OF THE INVENTION

Light-conducting building components are known in numerous forms from the prior art, for example, from German Utility Model DE 9310500 U1, PCT publication WO 03/097954 A1, and EPO publication EP 1305159 A1. The light-conducting components of the aforementioned prior art are characterized in that they have several glass fibers or glass fiber bundles that are cast into concrete, which typically do not remain at their prescribed location during casting of the concrete and are possibly damaged.

German patent application DE 102007013199 A1 therefore proposes a multilayer composite construction element, whose several layers of concrete and insulation material are penetrated by a rigid light-conducting element, which remains fixed as well as shape-stable and undamaged by its positioning in the several layers during casting of the concrete into the casting mold. In this prior art publication, several layers with recesses for the rigid light-conducting elements are required so that the entire multilayer composite construction element is relatively labor- and cost-intensive in production.

SUMMARY OF EMBODIMENTS OF THE INVENTION

A purpose of the disclosed embodiments of the present invention is to modify a component, especially a finished concrete part in the form of a masonry brick for structures and buildings, so that it can be produced much more quickly and cheaply than is possible when employing the teachings of the identified prior art.

In an embodiment of the invention, light-conducting pegs are fixed as cost effectively as possible in a support mat in order to achieve simple and inexpensive mounting of a light-conducting element. Several different embodiments are disclosed which accomplish the purpose stated above.

In a first embodiment the light-conducting pegs are produced in one piece in an injection molding die together with a light-conducting element formed as a lattice mat. This means that the injection molding mass in an injection molding die consists of a light conducting plastic and a flat support mat, consisting of intersecting and bonded longitudinal and transverse rods, is present in a (preferably) single injection molding process, at whose intersection points the light-conducting pegs protruding in a vertical direction from it are molded-on. Particularly simple production of an integral part is thus obtained, since this part in a subsequent work step is inserted into a casting mold and provided in alternation initially with a one-sided or two-sided insulation and/or reinforcement and then cast with a curable filling compound so that only the light-absorbing and light-emitting faces of the light-conducting pegs are still recognizable on the opposite flat sides of the board so produced. Simple and inexpensive production of light-conducting pegs arranged parallel to each other at mutual spacing is therefore guaranteed because they are integrated in a lattice mat.

There are different possibilities for production of the lattice mat, all of which are encompassed by the inventive idea of the present invention embodiments. In a first embodiment for production of the lattice mat, the lattice mat produced in the injection molding process consists of longitudinal and transverse rods that intersect in a single plane, between which openings are present, in which case the light-conducting pegs are molded onto the intersection points of the lattice mat so produced and their longitudinal extent runs perpendicular to the plane of the lattice mat.

In a second embodiment the lattice mat also consists of longitudinal and transverse rods intersecting in a plane, but in which the light-conducting pegs are not molded onto the intersection points of the longitudinal and transverse rods but into the openings between the longitudinal and transverse rods.

In a third embodiment a two-stage injection molding process occurs, in which a lattice element or support mat is initially produced in a first step and the light-conducting pegs in a second step are molded onto selected points ((either at the intersection points of a lattice mat or the openings of a support mat (preferably not formed as a lattice) or lattice mat forming a framework)).

Aspects of the concept here are that the light-conducting element is formed from a light-conducting construction material (for example, PMMA plastic or glass) as self-supporting 2D or 3D lattice element from rods with a thickness/diameter greater than or equal to 1 mm, the self-supporting 2D or 3D lattice element having roughly the same or only slightly smaller width W or length L or base dimension W×L or total outside dimension W×L×H than the casting mold itself in which the light-conducting component was produced.

A molded element with light-conducting pegs embedded in it is disclosed. The molded element can be formed as a façade panel, masonry brick, or interior finishing board.

If cast insulation is dispensed with, the support mat with the light-conducting pegs molded onto it is cast with a curing filling compound. In this case only one support layer is present. However, if inner insulation (on one or both sides) is applied during production to the support mat, this insulation is referred to as facing layer. It is preferred that the facing layer and/or support layer consists of wood composites, mineral filling compounds, polymer concrete, clays, limes, gypsum, plastic masses, and similar curable materials. It is described below as a possible practical example that the support layer (later also referred to as "matrix") consists of a foamed plastic, and interior finishing boards can favorably be produced with it. It is preferred here if the matrix consists of a polymer material with a density below 2000 kg/m$^3$.

By arranging the light-conducting pegs in the molded element, light can be guided from a light source from one side of the molded element to any other side surface. The light-conducting pegs are preferably arranged essentially parallel and the ends enter or emerge in two opposite essentially parallel surfaces. The molded elements are preferably cuboid and have a thickness in the range from 10 to 600 mm. Light can be guided by the light-conducting pegs from one side to the other side of the boards. Patterns can also be incorporated by the arrangement of the light-conducting pegs.

The number of the light-conducting pegs is guided according to the desired application. It essentially depends on the transmission coefficient of the pegs and the cross section covered by the emerging light-conducting pegs. Generally 5 to 90 vol %, preferably 5 to 50 vol %, light-conducting pegs are used (referred to the molded element).

Plastic materials from special organic polymers, for example, polymethacrylate, polycarbonate, or polystyrene, which can be processed in an injection molding or die casting method, are considered as appropriate light-conducting pegs. The attenuation factors are very low in the visible and near-infrared spectral range, for example, below 3 dB/km at 850 nm wavelength.

The light guides designed as light-conducting rods can also be constructed from different materials. In this case it has a core with a refractive index 1 to 2% greater than the outer material.

The matrix of the molded element, according to the disclosure herein, consists of a polymer material with a density below 2000 kg/m$^3$, preferably below 1200 kg/m$^3$. Because of its limited weight, it is particularly suited for suspended ceilings. However, the matrix is formed with particular preference for a polymer foam. Not only is the weight of the molded element thereby reduced, but at the same time the sound and heat insulation properties are significantly improved. The density of the polymer foam preferably lies in the range from 10 to 200 g/L, with particular preference in the range from 15 to 100 g/L.

The polymer foam can be constructed from the particle foam, for example, from expandable polystyrene (EPS) or polyolefin particle foams, or from expanded polypropylene (EPP).

An advantage of this structure is that the self-supporting 2D or 3D lattice elements or, in general, the support mat, lie against at least one inside wall of the casting mold or are positioned against it in position-stabilizing fashion without additional aid during casting of the casting mold with cast construction material. Because of this the lattice elements essentially retain their position as originally inserted into the casting mold, even during casting of the cast construction material.

The self-supporting 2D or 3D lattice element or support mat with the same or only slightly smaller base dimensions than the casting mold is positioned on the bottom of the casting mold so that it is only in contact with the bottom of the casting mold. The filling compound being cured is then cast in the form of a cast construction material (for example, concrete) into the casting mold from above so that the self-supporting 2D or 3D lattice element remains stable but is shifted slightly in the direction toward an inside wall of the casting mold and its position is stabilized there. The self-supporting 2D or 3D lattice element can naturally also be shifted into a corner of the casting mold so that it then lies fixed against two adjacent inside walls.

Rigid light-conducting pegs with a thickness/diameter greater than 1 mm protrude from one or more of the outside surfaces of the self-supporting 2D or 3D lattice element or support mat, which can then be supported on the inside walls of the casting mold. These rigid light-conducting pegs are preferably produced in a single working step bonded with the 2D or 3D lattice element, for example, by injection molding of light-conducting plastic such as PMMA, or glass.

The shape and cross section of the self-supporting 2D or 3D lattice element, its light-conducting longitudinal and transverse rods, and also the outward protruding rigid light-conducting pegs, are fully arbitrary, in which case a round or oval or polygonal cross section of the rods and pegs of the self-supporting 2D or 3D lattice element is preferred.

It is also preferred that the rigid light-conducting pegs protruding outward from the self-supporting 2D or 3D lattice element are arranged at the intersection points of the rods of the self-supporting 2D or 3D lattice element and are preferably perpendicular to it but also may be at any angle different from 90°, especially between ±45°. This offers the additional advantage of optimal light deflection and light configuration for a freely selectable light pattern on the outside of the finished light-conducting component according to embodiments of the invention.

These self-supporting 2D or 3D lattice elements can also be connected mechanically stable to each other vertically and/or horizontally before they are cast in the casting mold with cast material, in which case, after coupling the self-supporting 2D or 3D lattice elements, convey light to each other or also do not convey light, depending on the application.

After setting of the cast construction material the crude component is then removed from the casting mold and treated on at least some of its surfaces so that the light-conducting longitudinal and/or transverse rods of the self-supporting 2D or 3D lattice element and/or the outward protruding rigid light-conducting pegs are visible outside on the finished component. This surface treatment can be mechanical grinding, sandblasting, or water blasting, or chemical etching, or a combination thereof.

The principle is that a light-conducting rod-mat or support mat is produced in an injection molding process and this light-conducting rod-mat is then inserted into a casting mold, which is cast with cast material (for example, concrete) so that the entire lattice of the light-conducting rod-mat is enclosed by the cast material. The light-conducting rod-mat is therefore embedded in the cast material and this filling compound cures after pouring from the casting mold. The cast element so produced is then removed and ground in order to create surfaces that are accessible by the light.

There are different modifications (embedding of LEDs, front connection of LEDs, bottom connection of LEDs) or different embodiments of the light-conducting rods and connectors. An advantageous method according to embodiments of the invention functions as follows:

In this example, a PMMA mat is produced in the injection molding process. The injection molding machine has two opposite mold halves, which form a parting line between them. Appropriate injection molding dies, which are designed symmetric to each other, are introduced to opposite mold inserts (on the nozzle and ejector side). During mold closure of the two mold halves, the support mat or lattice mat is then injected in a single work step and at the same time the light-conducting pegs are arranged perpendicular to the plane of the support or lattice mat.

In a variant, a support mat (or lattice mat) provided with openings is inserted into the parting line into the (still open) mold halves. After mold closure only the light-conducting rods are injected into the openings of the support or lattice mat. The advantage of the latter method is that the material of the lattice or support mat can be chosen different from the material of the light-conducting pegs and because of this, flexible lattice or support mats can also be used, onto which the light-conducting pegs are then molded.

This is placed in a formwork with a height of about 3.5 cm and cast with concrete in the flow coating method or with other materials.

Because of the light-conducting mat, these are rods of about 35 mm in length that are joined by means of a transverse rod, guaranteeing that they can also be formed straight and in the same grid.

Insertion or inclusion of knit materials or light-conducting mats, as previously known, is not necessary, since this lattice is stable and fixed.

Transparent boards are produced, which are no longer cut. These boards are only surface-treated. The production size is at least 0.5 m², and the maximum size is variable.

The diameter of the PMMA surface to be viewed is variable, from 1 mm to any value. The height of the PMMA rod is also variable and is unrestricted.

These individual PMMA lattices are connected to a larger surface by special hooks, as may be required, so that the joint cannot be seen in the larger surface.

The transverse rods can also be variable in height. This is especially useful in high lattices.

It was mentioned previously that it is preferred to provide a lattice mat of intersecting longitudinal and transverse rods, in which case the light-conducting pegs protruding in the vertical direction are molded on in the same or a subsequent injection molding process.

In another embodiment of the invention it can be prescribed that the longitudinal and transverse rods do not lie in the same plane, but in two different planes. The longitudinal rods running in the longitudinal direction would therefore be arranged above the transverse rods positioned perpendicular to them and the connection surfaces between the longitudinal and transverse rods would then be on the bottom of the longitudinal rod and the top of the transverse rod.

Another variant is also possible in which the longitudinal rods are arranged above the transverse rods in two different planes.

In another embodiment of the invention it is prescribed that a support mat is provided, which consists of a plastic material.

The term "support mat" is understood to mean all plastic flat elements, which are supposed to be flexible or nonflexible. The invention consequently includes flexible and nonflexible support mats, in which case only a flexible support mat is assumed below in the interest of simpler description. Such a flexible support mat consists of a polyurethane foam, a rubber, or other elastomer material.

According to an embodiment of the invention a number of grid-like openings are provided in the support mat, such openings preferably being formed as round passage holes. However, the concept is not restricted to this configuration. Arbitrarily shaped openings can be present, such as rectangular or square passage holes.

Such a support mat is inserted into an injection mold and the light-conducting pegs from the previously mentioned light-conducting plastic are injected into the openings of the support mat. The support mat is therefore merely a holding matrix to accommodate the light-conducting pegs injected in the injection molding process. It is not necessary that all light-conducting pegs pass through all openings.

It is sufficient to arrange the light-conducting pegs at specified spacings in rows and columns in the openings of the support matrix and to also leave identically or differently shaped openings in between in order to later ensure during insertion of the finished support mat with the light-conducting pegs molded on it that the curable filling compound penetrates through the openings in the support mat and thus properly anchors the support mat in the curable filling compound.

If, as previously described, a flexible support mat is used, it is now possible for the first time to also produce bent board-like light panels, because with the given technical teaching not only can straight board elements (extending in one plane) be produced, but so can three-dimensional elements bent in two planes or three planes.

The support mat occupied with the light-conducting pegs can be bent into any shape, in which case only a round shape is assumed with reference to latter practical examples so that sleeve-like hollow elements can be produced with it, in which the light-conducting pegs point radially inward with their light-absorbing faces and the opposite face of the corresponding light-conducting peg faces radially outward. Columns and other round elements in interior or exterior finishing of structures can be enclosed with such sleeve-like light-conducting elements and then produce a unique shape impression, since the light-conducting rods can be exposed, for example, from an interior light source and emit their light radially outward.

BRIEF DESCRIPTION OF THE DRAWING

The objects, advantages, and features of the embodiments of the invention will be more clearly perceived from the following detailed description, when read in conjunction with the accompanying drawing, in which:

FIG. 6 shows an enlarged view of a side surface of the lattice element with molded-on connection elements;

DETAILED DESCRIPTION OF EMBODIMENTS OF THE INVENTION

The self-supporting 2D lattice element 1 according to an embodiment of the invention in FIGS. 1-8 is preferably produced in a single production process from a single material, for example, by injection molding (PMMA, for example) or generally in a casting process (glass), for example.

Self-supporting 2D lattice element 1 has longitudinal rods 2 in the longitudinal direction (L) and transverse rods 3 running across them in the width direction (W) and bonded to them as they intersect. At these intersection points of the longitudinal and transverse rods light-conducting pegs 4 and 5 (FIG. 2) protruding upward and downward at a 90° angle in the height direction are molded on in bonded fashion so that an overall 3D lattice element is produced having a length L, a width W, and a height H, which are only slightly smaller than the dimensions (L, W, and H) or the base (L and W) of the casting mold, which is discussed below. Light-conducting connection surfaces 6 and 7 (FIG. 8) are therefore present at the intersection points of light-conducting pegs 4 and 5 with longitudinal and transverse rods 2 and 3.

Since longitudinal and transverse rods 2 and 3 are designed roughly cylindrical in cross section and have a diameter of about 4 mm, and light conducting pegs 4 and 5 taper conically from the longitudinal and transverse rods from the direction of the free end from about 4.5 mm to about 4 mm in diameter under a surface angle of about 1.64°, the connection surfaces 6 and 7 run arc-like and are in contact with each other in light-conducting fashion roughly in the center of longitudinal and transverse rods 2 and 3, that is, roughly in the center of the entire 2D or 3D lattice element 1. This is best apparent in FIG. 8.

Figures 1, 2, 3, 4, 5, 6, 7, 8, 9, 10:
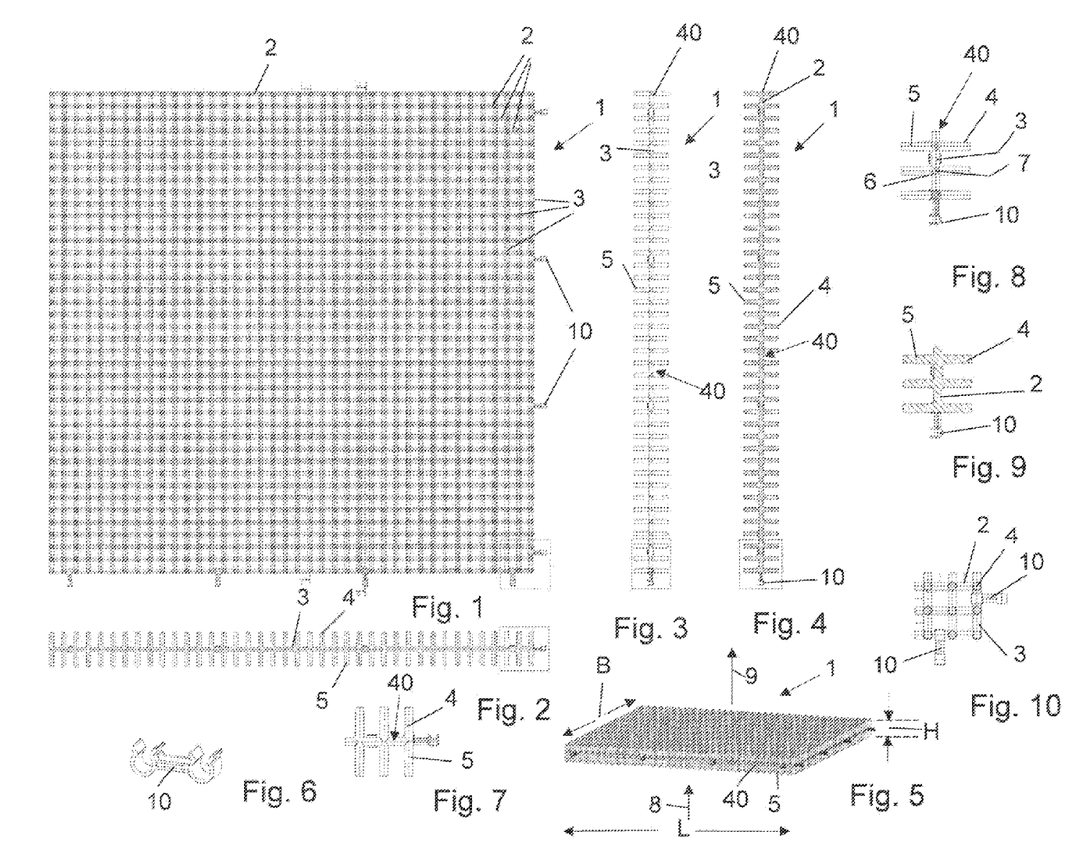
FIG. 1 is a top view of a self-supporting 2D lattice element according to an embodiment of the invention with light-conducting pegs protruding upward and downward.
FIG. 2 is a front or elevation view of FIG. 1 embodiments.
FIG. 3 is a sectional view taken along cutting plane D-D of FIG. 1 through the rods of the self-supporting 2D lattice element running in the longitudinal direction and width direction.
FIG. 4 is a sectional view taken along cutting plane C-C of FIG. 1 only through the rods of the self-supporting 2D lattice element running in the longitudinal direction.
FIG. 5 is a perspective view of the lattice element of FIG. 1.
FIG. 6 is an enlarged perspective view of a connection element employed in the FIG. 1 embodiment.
FIG. 7 shows detail 8 from FIG. 2.
FIG. 8 shows detail 6 from FIG. 3.
FIG. 9 shows detail 7 from FIG. 4.
FIG. 10 shows detail 5 from FIG. 1.
Figures 11, 12, 13:
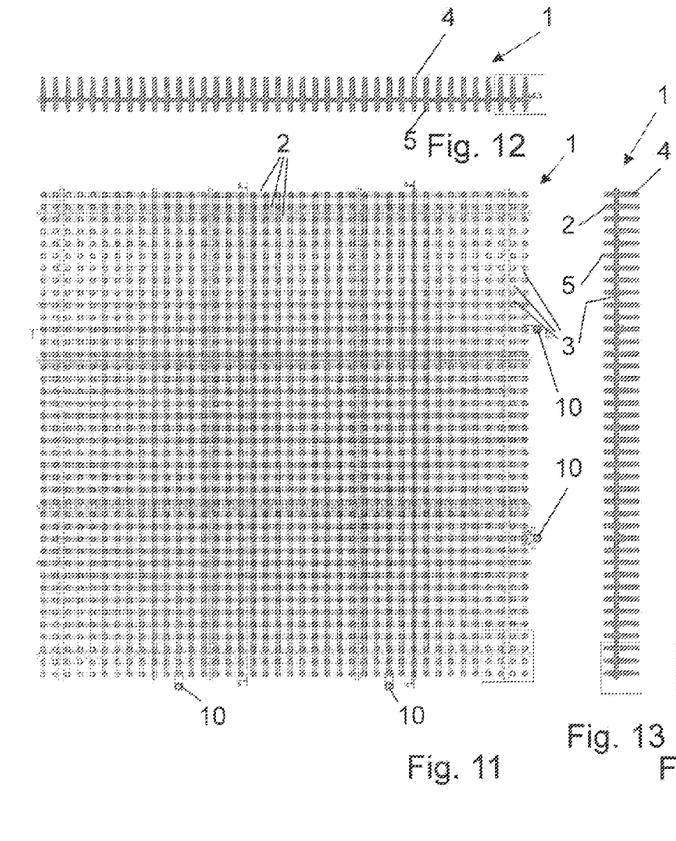
FIG. 11 is a top view of a lattice element of a modified embodiment relative to FIG. 1.
FIG. 12 is a sectional view taken along cutting plane C-C in FIG. 11.
FIG. 13 is a sectional view taken along cutting plane A-A in FIG. 11.

With reference to FIGS. 5 and 8, direct light conduction from below through lower light-conducting peg 5 in light conduction direction 8 into upper light-conducting peg 4 in light conduction direction 9 is therefore possible without much light being guided into longitudinal transverse rods 2 and 3. The main direction of light conduction is therefore from 8 to 9 in light-conducting pegs 4 and 5, there being a secondary direction of light conduction across it into longitudinal transverse rods 2 and 3. The ratio of main direction to secondary direction of light conduction can be set arbitrarily by means of the diameter ratios between longitudinal and transverse rods 2 and 3 as well as light-conducting pegs 4 and 5.

As an example a lattice grid in FIG. 8 of about 12.5 mm of longitudinal and transverse rods 2 and 3 is shown here so that a free spacing of adjacent light-conducting pegs 4 and 5 of about 8.5 mm is produced.

The light-conducting pegs protrude about 15.5 mm at about 90° in both directions (H) from longitudinal transverse rods 2 and 3 (FIG. 5), the longitudinal transverse rods have a diameter of about 4 mm, so that an overall height H of 3D lattice element 1 of about 35 mm is obtained.

Rigid light-conducting pegs 4, 5 protrude outward from self-supporting 2D or 3D lattice element 1 are arranged at the intersection points of rods 2, 3 and are preferably perpendicular to it. However, the light-conducting pegs may also be arranged at an arbitrary angle different from 90°, especially between ±45°.

Several self-supporting 2D or 3D lattice elements 1 can be connected vertically and/or horizontally in mechanically stable fashion to each other via coupling elements 10 (FIG. 6), in which the lattice elements, after coupling, convey light from one to another. In another variant it is prescribed that the coupling elements are designed to be non-light-conducting but merely serve for mechanical joining of the individual support mats 40 (see FIG. 5).

Coupling elements 10 are shown in FIGS. 1 through 10, with which mechanical, and preferably light-conducting coupling can occur between several vertically or horizontally, or both, adjacent self-supporting 2D or 3D lattice elements 1.

FIGS. 1 to 10 make it clear that it is advantageous to mold upward and downward protruding (by 90°) light-conducting pegs 4, 5 to a lattice mat consisting of intersecting longitudinal and transverse rods 2, 3, which are designed as a support mat 40 in a single work step.

Figures 14, 15, 16, 17, 18, 19, 20, 21, 22:
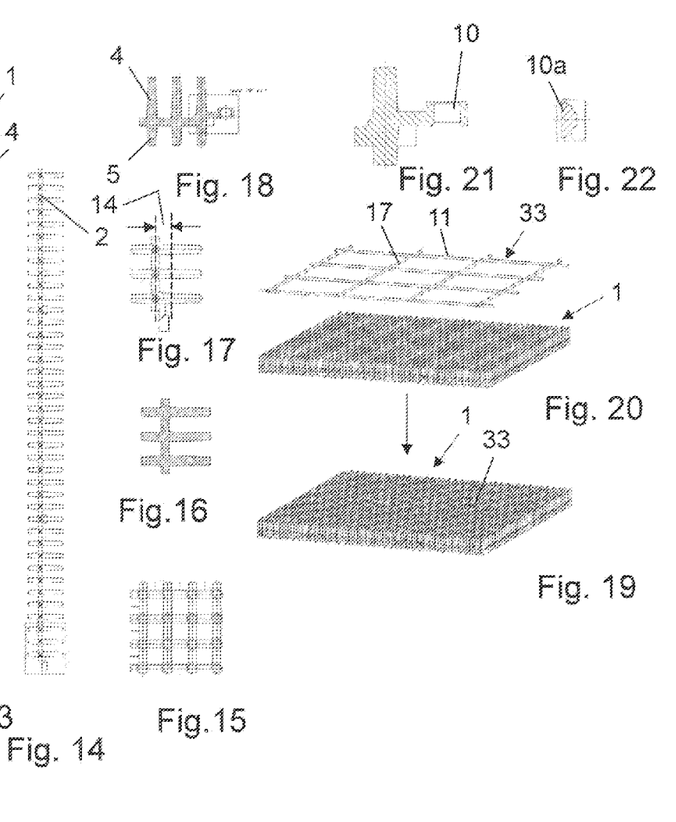
FIG. 14 is a sectional view taken along cutting plane B-B in FIG. 11.
FIG. 15 shows detail 1 according to FIG. 11.
FIG. 16 shows detail 2 according to FIG. 13.
FIG. 17 shows detail 3 according to FIG. 14.
FIG. 18 shows detail 4 according to FIG. 12.
FIG. 19 is a perspective view of a reinforced lattice element in accordance with an embodiment of the invention.
FIG. 20 is a perspective view of the lattice element according to FIGS. 11 to 18 with a reinforcement mat.
FIG. 21 shows detail 5 according to FIG. 18.
FIG. 22 is a sectional view taken along cutting plane D-D in FIG. 11.
Figures 23, 24, 25:
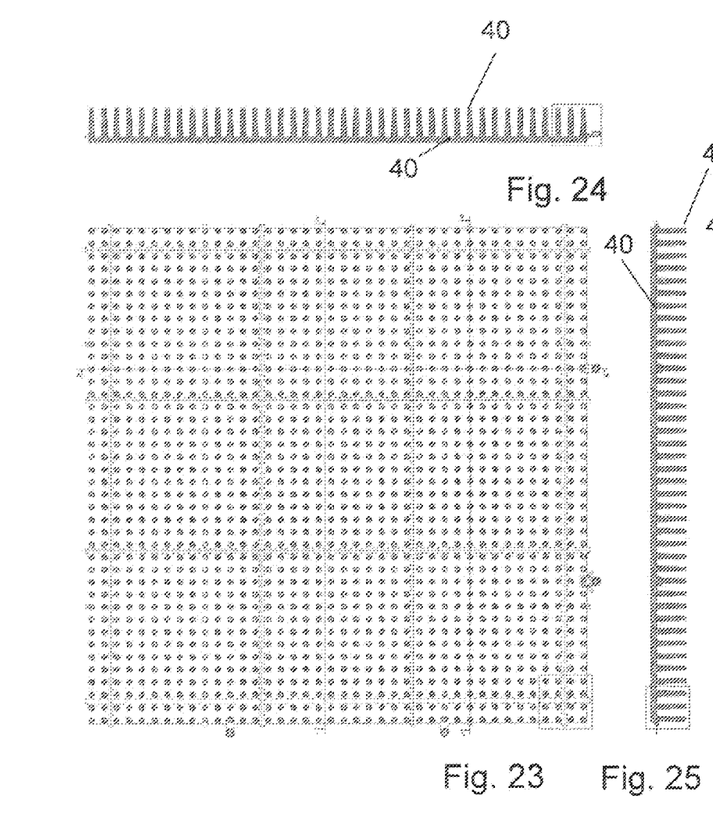
FIG. 23 is a top view of a third variant of a lattice element in accordance with an embodiment of the invention.
FIG. 24 is a sectional view taken along cutting plane A-A in FIG. 23.
FIG. 25 is a sectional view taken along cutting plane B-B in FIG. 23.

FIGS. 11 to 19 show as a second practical example a lattice element 1 in which the intersecting longitudinal transverse rods 2, 3 no longer form a center plane in the form of a support mat 40. Instead, the connection plane formed from support mat 40 for light-conducting pegs 4, 5 is displaced downward by an offset 14 (FIG. 17). The upper light-conducting pegs 4 are therefore longer than the lower light-conducting pegs 5 and a reinforcement mat 33 can be inserted into the additional flat space produced by offset 14, as shown in FIGS. 19 and 20. This is also shown and described in FIGS. 32 and 33 and in FIGS. 34 and 35.

FIGS. 23 to 33 also show that instead of a support mat with intersecting longitudinal transverse rods a board-like smooth support mat can be used, with the light-conducting pegs 4 molded on top of the mat.

It is not depicted in the drawing that additional light-conducting pegs 5 can also be arranged on the bottom, which are connected either in a light-conducting manner with upper light-conducting pegs 4, or not. In the latter case the lower light-conducting pegs 5 would be molded on the other locations on the bottom of support mat 40 comparable to light-conducting pegs 4 arranged on the top.

It was pointed out above in the general description that it is also sufficient according to a modification of the invention to initially produce a support mat from intersecting longitudinal and transverse rods 2, 3 and then in a second working step, to mold on the light-conducting pegs 4, 5, either on the intersection points or openings of the lattice mat so produced.

Figures 26, 27, 28, 29, 30, 31, 32, 33:
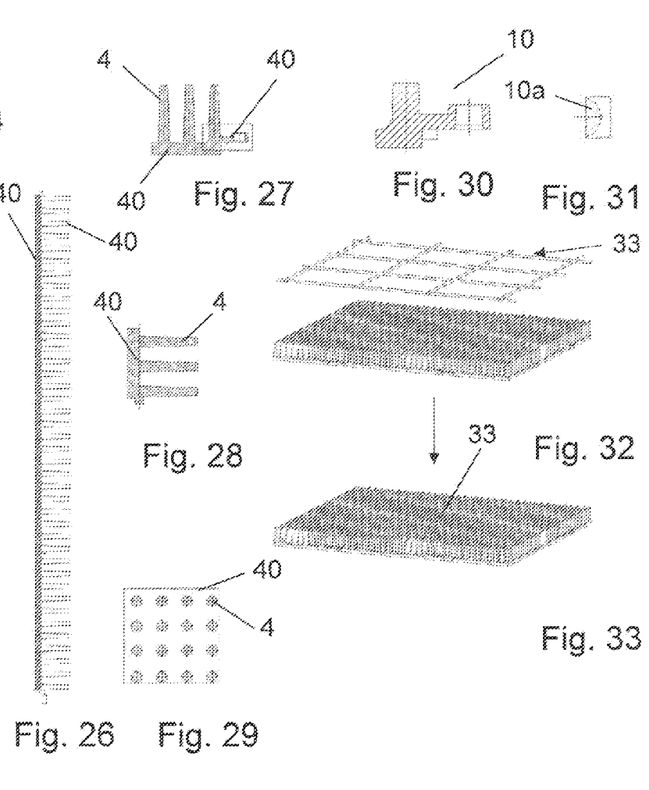
FIG. 26 is a sectional view taken along cutting plane C-C in FIG. 23.
FIG. 27 shows detail 1 from FIG. 24.
FIG. 28 shows detail 3 from FIG. 25.
FIG. 29 shows detail 2 from FIG. 23.
FIG. 30 shows detail 4 from FIG. 27.
FIG. 31 is a sectional view taken along cutting plane D-D in FIG. 23.
FIG. 32 is the lattice element according to FIG. 33 with introduced reinforcement.
FIG. 33 is a perspective view of a lattice element before introduction of a reinforcement.
Figure 34:
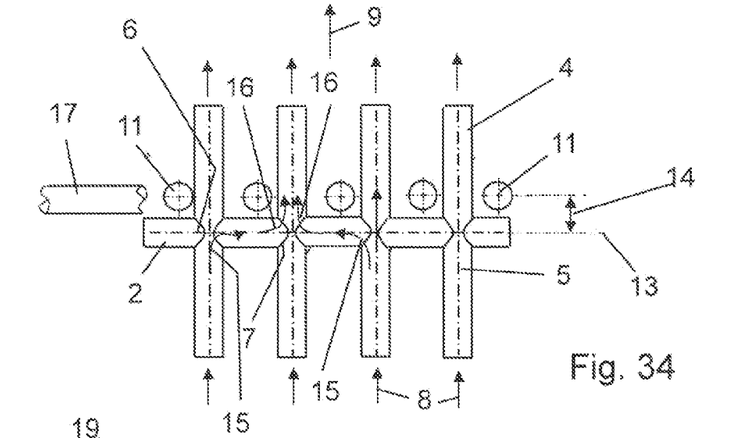
FIG. 34 is an enlarged sectional view through a lattice element according to FIG. 19.
Figure 35:
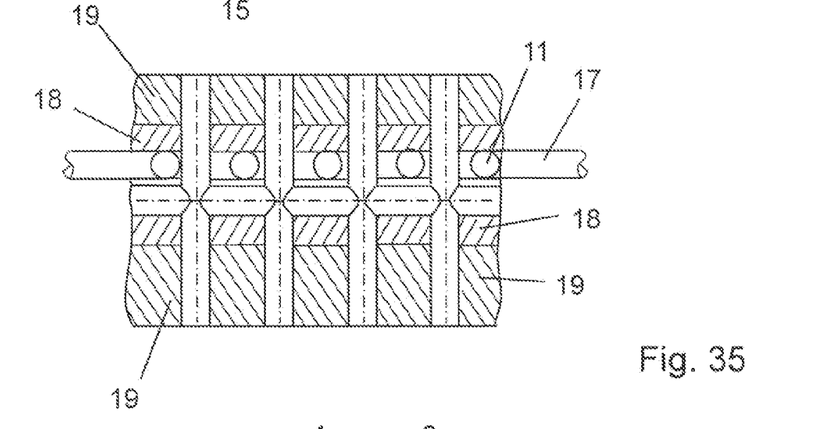
FIG. 35 shows the lattice element according to FIG. 34 after introduction of insulation and casting with a curing filling compound.

FIGS. 34 and 35 show more precisely, in comparison with FIGS. 20 and 32, that it is prescribed in a modification of the invention to provide the lattice element with intersecting longitudinal and transverse rods 2, 3 or support mat 40 with additional reinforcement.

According to FIG. 34 reinforcement rods 11 can be inserted in the intermediate spaces between light-conducting pegs 4, 5 which, in a preferred embodiment, consist of the usual structural steel and also correspond to the reinforcement rods 11 ordinarily used for ordinary concrete work in size and material configuration.

These are loosely inserted into the intermediate spaces between light-conducting pegs 4 and later coated according to FIG. 35 either with a (heat-insulating) insulation 18 or filled in over the entire surface uniformly with filling compound.

FIG. 34 shows as an additional practical example that, in addition to the reinforcement rods 11 positioned parallel, a lattice of reinforcement rods can also be used in which the parallel-positioned reinforcement rods 11 with reinforcement rods 17 running perpendicular to them form an ordinary reinforcement mat 33, as is common in concrete construction as a structural steel web (see FIGS. 20, 32).

In this case it is preferred if the reinforcement rods 11, 17 are arranged in the longitudinal center plane 12 of the lattice element so produced, because the best reinforcement is present there. It is then prescribed that the connection plane of the support mat 40, with the intersecting longitudinal transverse rods 2, 3, is offset downward and forms a component plane 13 that is shifted downward from the center plane 12 by offset 14. This is shown in FIGS. 17 and 34. In this way it is ensured that reinforcements 11, 17 are arranged precisely in the center longitudinal plane of the lattice element or support mat 40 so produced.

FIG. 34 also shows light conduction in the variant of the lattice element for a case in which the longitudinal and transverse rods are also produced from a light-conducting plastic. There it is shown that light entering in arrow direction 8 is deflected at the intersection points of the longitudinal transverse rods 2, 3 in arrow direction 15, passes through the longitudinal rod 2 or the longitudinal rod 3 connected perpendicular to it and is then introduced in arrow direction 16 into the material cross section of the light-conducting peg 4 connected to it.

The light yield of such a lattice element is significantly improved, since scattered light introduction occurs from light-conducting pegs 4, 5 arranged parallel next to each other, in which the light is introduced from one light-conducting peg 4, 5 via arrow directions 15, 16 into the light-conducting peg 4, 5 arranged parallel to it.

As previously stated, the invention, however, is not restricted to this.

It can also be prescribed that the longitudinal transverse rods are formed from a nontransparent or only opaque material.

FIG. 35 further shows that after introduction or reinforcement with reinforcement rods 11 and/or a combination of reinforcement rods 11 and 17, it is preferred to initially cast a layer of insulation 18 into the mold, in which this insulation consists of a heat-insulating material. This can be a foaming material, like a polyurethane foam or also glass fiber mat or other insulation material. These then form a facing layer.

After introduction of insulation 18 the entire lattice element can then be cast as a flat element, in which the curable filling compound 19 form the flat limitations of the lattice element on the top and bottom.

Figure 36:
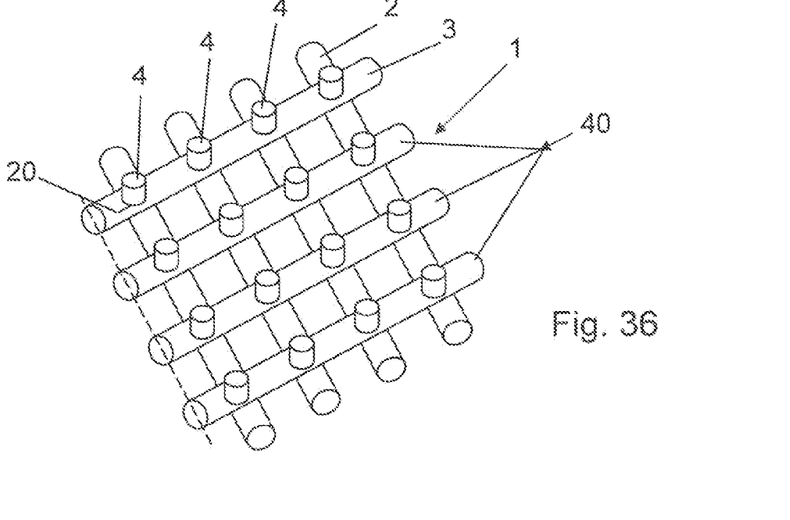
FIG. 36 shows a perspective view of a lattice element with subsequently molded-on light-conducting pegs.

FIG. 36 shows in a modification of FIGS. 34 and 35 that it is also possible according to this concept to form a support mat 40 as a lattice element 1 according to the preceding FIGS. 1 to 33, but that it can also be prescribed to arrange the longitudinal and transverse rods 2, 3 in two different planes relative to each other.

The light-conducting pegs 4, 5 can be molded on here in a separate work step or also in the same work step on the intersection points 20 of the longitudinal and transverse pegs.

If longitudinal and transverse rods 2, 3 consist of a light-conducting material, no additional preliminary work is required. A light-conducting support mat 40 with light-conducting pegs 4, 5 molded to it is therefore produced in two different work steps.

However, if longitudinal rods 2, 3 consist of a non-light-conducting or only a slightly light-conducting material, it is then expedient to apply holes in the intersection points 20 of the intersecting longitudinal transverse rods and to inject the light-conducting pegs 4, 5 through these holes. The light-conducting pegs 4 depicted in FIG. 36, which are molded on the top, can also be continued downward as light-conducting peg 5 molded on the bottom (FIG. 36).

Figure 37:
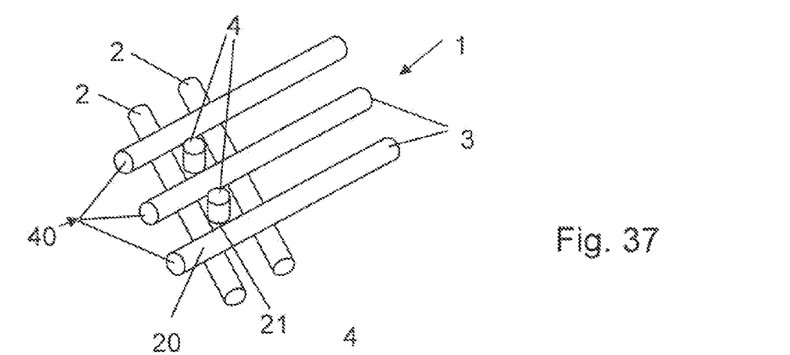
FIG. 37 is a fragmentary perspective view of a variant modified relative to FIG. 36.

FIG. 37 shows a variant modified from this, from which it is apparent that it does not require a solution to apply light-conducting pegs 4, 5 in the areas of intersection points 20. This figure shows that the light-conducting pegs 4, 5 are injected into the intermediate spaces 21 between intersecting longitudinal and transverse rods 2, 3.

Figure 38:
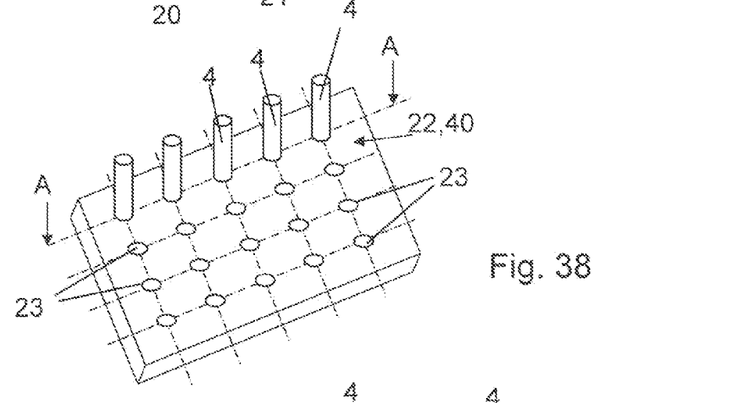
FIG. 38 is a perspective view of a support mat with injected light-conducting pegs according to an embodiment of the invention.

FIG. 38 shows as an additional practical example that it is also sufficient for production of a support mat 40 to initially produce a perforated mat 22 from any material.

In the interest of simpler description a perforated mat 22 is described below, which consists of a flexible, elastomeric plastic, which can be formed from a rubber mat, natural rubber mat, or polyurethane mat, for example. Such a perforated mat, however, can also be formed as a (plastic) film mat with relatively limited wall thickness, because it is sufficient to make a number of passage openings 23 or arbitrarily shaped openings in this perforated mat. Shaping of passage holes 23 is arbitrary. They can be designed round, angled, square, or hexagonal.

Figure 39:
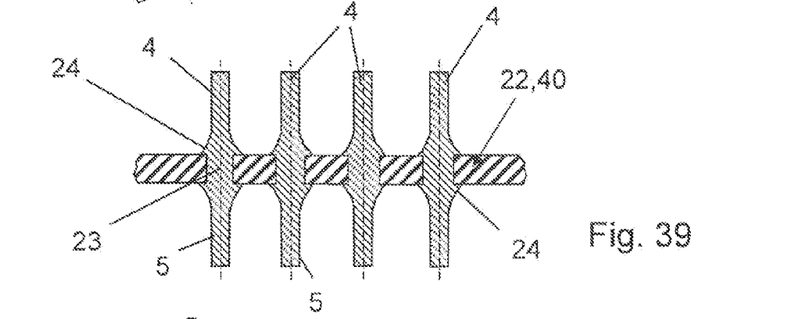
FIG. 39 is a sectional view taken through cutting plane A-A in the arrangement according to FIG. 38.

As shown in FIGS. 38 and 39, such a perforated mat 22 is inserted into an injection mold and the light-conducting pegs 4, 5 are then injected into the perforated mat through passage openings 23 in a single injection molding process. It is preferred here that the light-conducting pegs overlap passage holes 23 with radially outward directed collars 24 for better anchoring in order to achieve reliable fastening in the area of perforated mat 22.

Figure 40:
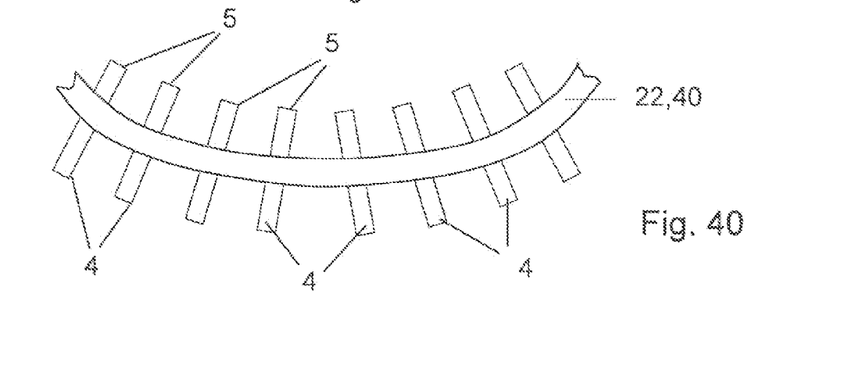
FIG. 40 shows a view of the bendability of a light-conducting element produced according to the embodiment of FIGS. 38 and 39.

FIG. 40 shows that a support mat 40 produced from a perforated mat 22 with light-conducting pegs 4, 5 anchored in it can be bent into any arbitrary shape. As shown here, a semi-round bent shape is an example. However, fully round bent shapes can be used so that closed sleeve-like or hollow cylindrical elements can be bent for the first time which are then formed later by insertion into an injection mold to a sleeve-like or hollow cylindrical wall, sealing, or cladding element, which carries light-conducting pegs 5, 4 protruding radially from the inside out.

Figure 41:
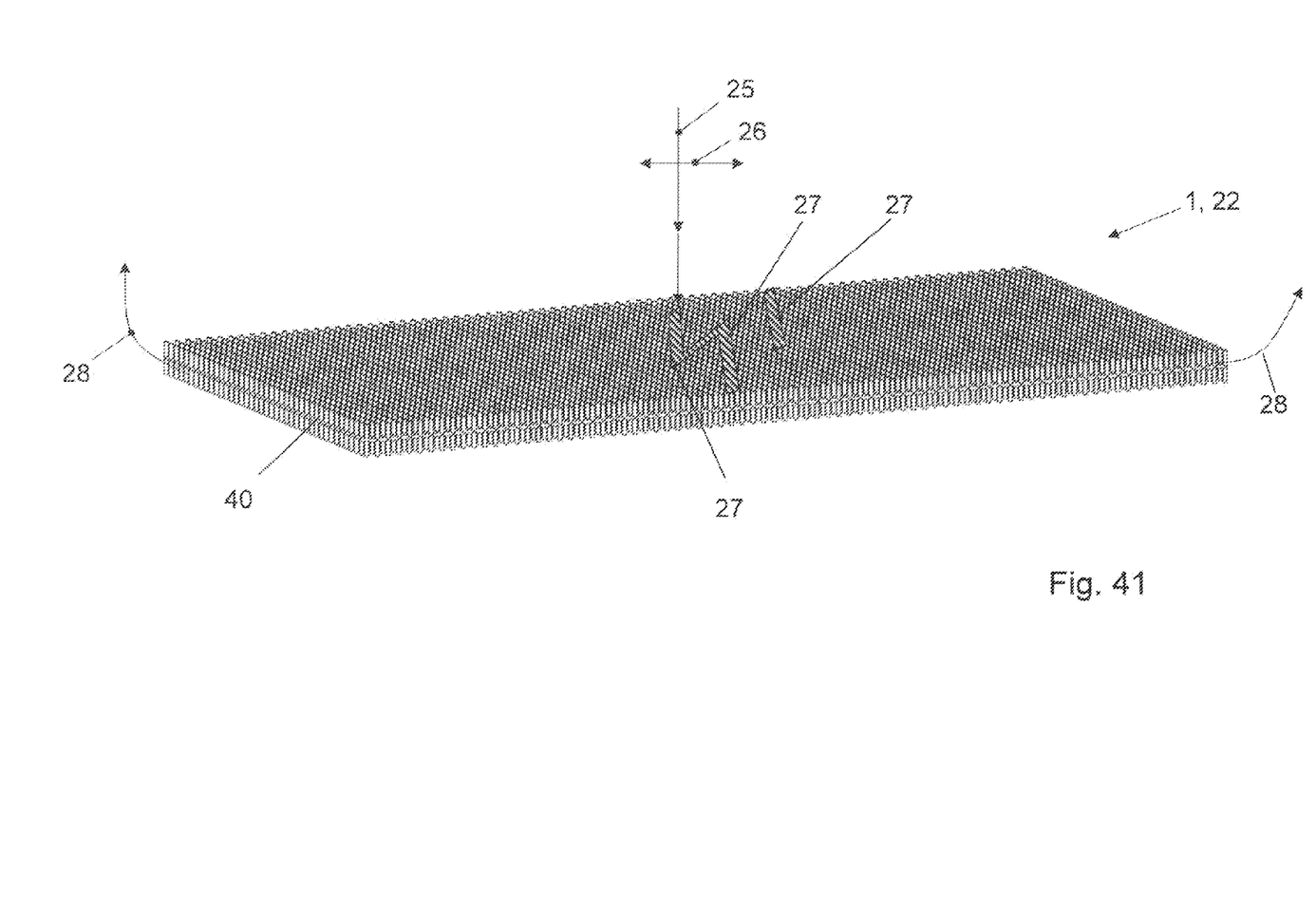
FIG. 41 is a perspective schematized view of a lattice or support mat provided with light-conducting pegs in which certain light-conducting pegs are melted out with a laser writer in order to suppress their light guiding in accordance with an embodiment of the invention.

FIG. 41 also shows that it is possible with a laser beam 25 to make certain light-conducting faces 31 (FIG. 44) of light-conducting pegs 4, 5 inactive for light passage on lattice element 1 or support mat 40 produced according to previous practical examples. Here the light-emitting or light-absorbing faces 31 are melted by the laser beam 25 by burning in a specified layer combination or symbol in the arrow directions 26 in the form of burn tracks 27 and thus melting the light-absorbing or light-emitting faces 31 of light-conducting pegs 4, 5 so that no light passage is present on the melted faces. This involves a laser writer, which before casting of the lattice element or support mat in a curing filling compound initially burns in specified symbols from the light-emitting and/or light-absorbing faces of the light-conducting pegs.

FIG. 41 also indicates that a lattice mat so produced can be bent in any bending directions 28, two- or three-dimensionally.

Figure 42:
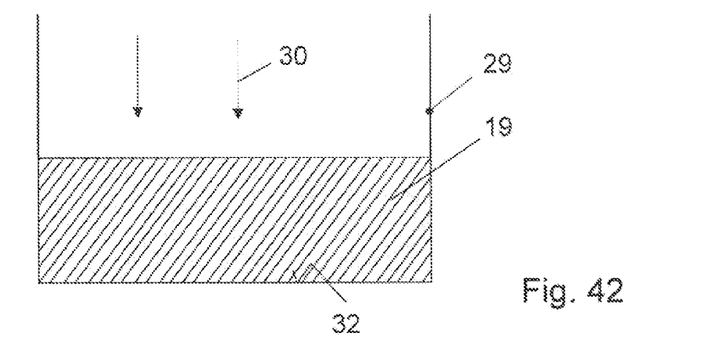
FIG. 42 is a depiction of the casting mold in the first method step in accordance with an embodiment of the invention.
Figure 43:
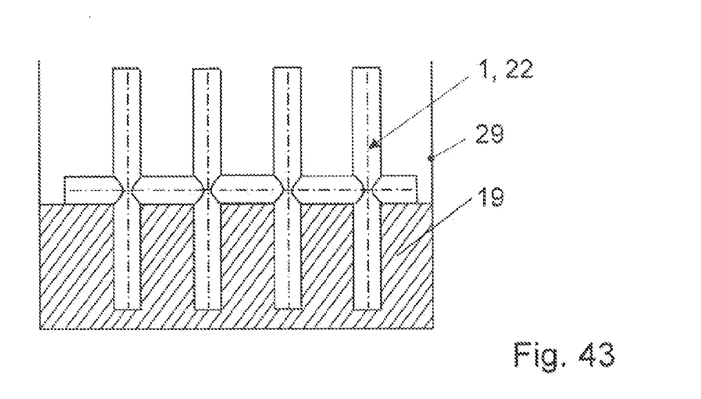
FIG. 43 shows insertion of the lattice element into the casting mold after the second method step.
Figure 44:
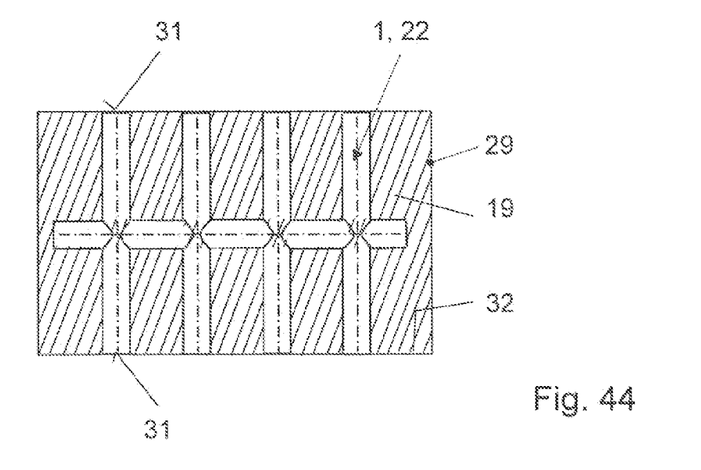
FIG. 44 shows the finished casting of the lattice element in the casting mold after the third method step.

FIGS. 42 to 44 show a schematized view of the casting mold 29, where it is apparent that the curable filling compound 19 is initially cast on the bottom 32 of the casting mold and before curing the lattice element 1, 22, 40 produced according to the previous method is forced into the still uncured filling compound so that it acquires the configuration according to FIG. 43.

The reinforcement according to FIGS. 34 and 35 and optionally also insulation can then be introduced in order to then cast the lattice element half produced in FIG. 43 fully with filling compound 19 so that a flexible and inflexible flat element is produced. The light-absorbing or light-emitting faces 31 of the light-conducting peg are then exposed.

Figure 45:
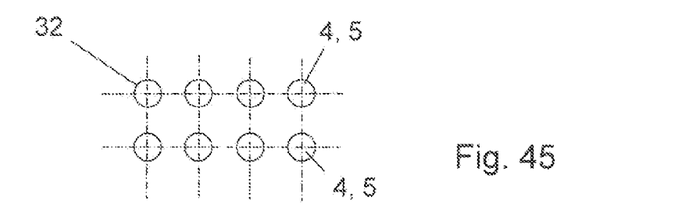
FIGS. 45-50 are depictions of different profile shapes of light-conducting pegs in accordance with embodiments of the invention.
Figure 46:
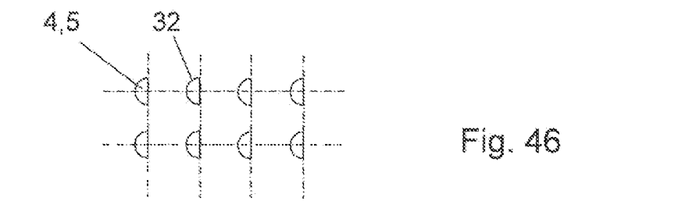
Figure 47:
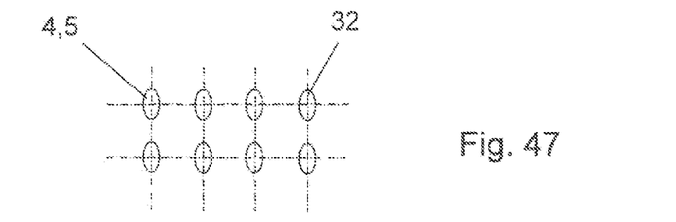
Figure 48:
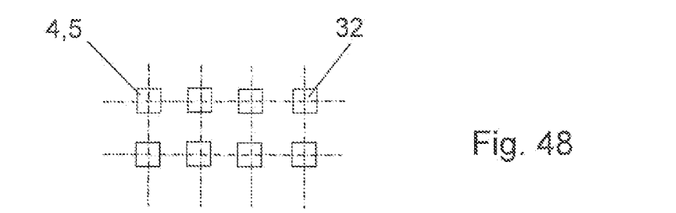
Figure 49:
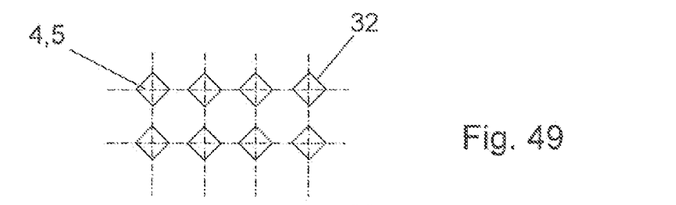
Figure 50:
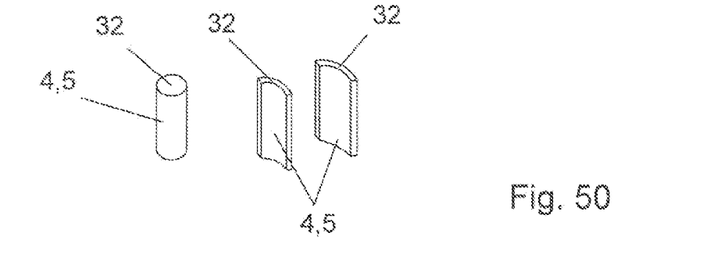

FIGS. 45 to 50 show different possible profile shapes of light-conducting pegs 4, 5, in which FIG. 45 shows a round profile, FIG. 46 a semi-round profile, and FIG. 47 an oval profile. FIG. 48 shows a square or rectangular profile, whereas FIG. 49 shows a rhombic form. FIG. 50 shows that light-conducting pegs 4, 5 can also be configured as a straight rod or a bent otherwise flat format.

DRAWING LEGEND

1 Self-supporting 2D or 3D lattice element
2 Light-conducting longitudinal rods of 1
3 Light-conducting transverse rods of 1
4 Light-conducting pegs protruding upward 90°
5 Light-conducting pegs protruding downward 90°
6 Light-conducting connection surfaces between 2 and 4
7 Light-conducting connection surface between 2 and 5
8 Direction of entering light
9 Direction of emerging light
10 Coupling elements
L=length of 1
W=width of 1
H=height of 1
11 Reinforcement rod
12 Center plane
13 Component plane
14 Offset
15 Arrow direction
16 Arrow direction
17 Reinforcement rod
18 Insulation
19 Filling compound
20 Intersection point
21 Intermediate space
22 Perforated mat
23 Passage hole
24 Column
25 Laser beam
26 Arrow direction
27 Burn track
28 Bending direction
29 Casting mold
30 Arrow direction
31 Faces of pegs
32 Bottom (of 29)
33 Reinforcement mat
40 Support mat

What is claimed is:

1. A light-conducting component in the form of a masonry brick or façade or interior finishing board for structures and buildings, comprising:
a light-conducting element formed front a light-conducting construction material selected from the group consisting of PMMA plastic and glass, said light-conducting element comprising:
a light-conducting flat support mat having a top and a bottom;
a plurality of first light-conducting pegs projecting upwardly with respect to the top of said support mat;
a plurality of second light-conducting pegs projecting downwardly with respect to the bottom of said support mat;
said first and second light-conducting pegs having distal faces which are light absorbing and light emitting;
said support mat being perforated with passage holes; and
said first and second light-conducting pegs extending through the passage holes and their proximal ends being integrally molded to said support mat, there being a light-conducting couplng between said light-conducting pegs and said support mat.

2. The light-conducting component according to claim 1, wherein said flat support mat is formed of a light-conducting material.

3. The light-conducting component according to claim 2, wherein said flat support mat is formed of a flexible material.

4. The light-conducting component according to claim 1, wherein said flat support mat is formed of a flexible material.

5. The light-conducting component according to claim 1, wherein said light-conducting pegs are molded as light-conducting pegs onto the material of the support mat at least on one side.

6. The light-conducting component according to claim 1, wherein the cross section of the light-conducting rods and the outward protruding rigid light-conducting pegs is selected from the group consisting of circular, oval and polygonal in shape.

7. A light-conducting component according to claim 1, and further comprising at least one reinforcement mat inserted on the surface of said flat support mat into the intermediate spaces between the light-conducting pegs on at least one side of said flat support mat.

8. The light-conducting component according to claim 1, and further comprising heat insulation on at least one surface of said flat support mat.

9. The light-conducting component according to claim 1, and further comprising at least one curing filling compound enclosing said first and second light-conducting pegs on the top and bottom of said support mat, leaving the distal faces of said pegs exposed.

10. A light-conducting component in the form of a masonry brick or façade or interior finishing board for structures and buildings, comprising:
a light-conducting element formed from a light-conducting construction material selected from the group consisting of PMMA plastic and glass, said light-conducting element comprising:
a flat light-conducting support mat having a top and a bottom, said flat support mat being formed of intersecting and joined transverse and longitudinal light-conducting rods with intermediate spaces between the rods with intermediate spaces between the rod sections;
a plurality of first light-conducting pegs projecting upwardly with respect to the top of said support mat;
a plurality of second light-conducting pegs projecting downwardly with respect to the bottom of said support mat;
said first and second light-conducting pegs having distal faces which are light absorbing and light emitting; and
stud first and second light-conducting pegs being bonded by injection molding in the intermediate spaces in said flat support mat.

11. The light-conducting component according to claim 10, wherein said flat support mat is formed of a light-conducting material.

12. The light-conducting component according to claim 11, wherein said flat support mat is formed of a flexible material.

13. The light-conducting component according to claim 10, wherein said flat support mat is formed of a flexible material.

14. The light-conducting component according to claim 10, wherein said light-conducting pegs are molded as light-conducting pegs onto the material of the support mat at least on one side.

15. The light-conducting component according to claim 10, wherein the cross section of the light-conducting rods and the outward protruding rigid light-conducting pegs is selected from the group consisting of circular, oval, and polygonal in shape.

16. The light-conducting component according to claim 10, and further comprising at least one reinforcement mat inserted on the surface of said flat support mat into the intermediate spaces between the light-conducting pegs on at least one side of said flat support mat.

17. The light-conducting component according to claim 10, and further comprising heat insulation on at least one surface of said flat support mat.

18. The light-conducting component according to claim 10, and further comprising at least one curing filling compound enclosing said transverse and longitudinal rods and said first and second light-conducting pegs of said flat support mat, leaving the distal faces of said pegs exposed.

19. A method of producing the light-conducting component according to claim 1 in which the following steps are used:
the flat support mat is placed in a casting mold;
a curable filling compound is then cast into the casting mold from the top to form a crude component;
after curing of the filling compound the crude component is then removed from the casting mold;
on at least some of its surfaces the crude component is treated so that the faces of the light-conducting pegs are visible on the outside on the component; and
surface treating the visible faces of the light-conducting pegs by a process selected from the group consisting of mechanical grinding, sand blasting, water blasting, chemical etching, or a combination thereof.

20. A method of producing the light-conducting component according to claim 10 in which the following steps are used:
the flat support mat is placed in a casting mold;
a curable filling compound is then cast into the casting mold front the top to form a crude component;
after curing of the filling compound the crude component is then removed from the casting mold;
on at least some of its surfaces the crude component is treated so that the faces of the light-conducting pegs are visible on the outside on the component; and
surface treating the visible faces of the light-conducting pegs by a process selected from the group consisting of mechanical grinding, sand blasting, water blasting chemical etching, or a combination thereof.

21. The method of claim 20, wherein said step of treating the faces includes faces of said transverse and longitudinal rods.

* * * * *